United States Patent
Cohen et al.

(10) Patent No.: US 7,296,884 B2
(45) Date of Patent: Nov. 20, 2007

(54) MICROWAVE CURABLE INKS FOR INKJET PRINTING

(75) Inventors: Eytan Cohen, Ra'anana (IL); Michael Kheyfets, Jerusalem (IL); Rafael Bronstein, Kfar Saba (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 238 days.

(21) Appl. No.: 10/811,863

(22) Filed: Mar. 30, 2004

(65) Prior Publication Data

US 2004/0179076 A1    Sep. 16, 2004

Related U.S. Application Data

(63) Continuation-in-part of application No. 10/694,876, filed on Oct. 29, 2003, now abandoned.

(60) Provisional application No. 60/421,832, filed on Oct. 29, 2002.

(51) Int. Cl.
  *C09D 11/00*    (2006.01)
(52) U.S. Cl. .................. 347/100; 522/74; 522/79; 522/81; 522/83; 523/160
(58) Field of Classification Search ................. 347/100; 522/74, 79, 81, 83; 523/160
  See application file for complete search history.

(56) References Cited

U.S. PATENT DOCUMENTS

| | | | | |
|---|---|---|---|---|
| 4,156,626 A * | 5/1979 | Souder | .................... | 156/273.3 |
| 5,322,751 A * | 6/1994 | Chou et al. | .................... | 430/33 |
| 5,470,691 A * | 11/1995 | Arai et al. | ................ | 430/273.1 |
| 5,743,946 A * | 4/1998 | Aoki et al. | ................ | 106/31.95 |
| 5,965,252 A * | 10/1999 | Santo et al. | ............. | 428/32.36 |
| 6,114,406 A | 9/2000 | Caiger et al. | | |
| 6,145,979 A | 11/2000 | Caiger et al. | | |
| 6,242,156 B1 * | 6/2001 | Teng | ........................ | 430/270.1 |
| 6,344,497 B1 * | 2/2002 | Meyrick et al. | ............ | 523/160 |
| 6,528,557 B2 * | 3/2003 | Lin | ............................ | 523/160 |
| 6,620,573 B2 * | 9/2003 | Van Damme et al. | ... | 430/270.1 |
| 2002/0068772 A1 * | 6/2002 | Laksin et al. | ................ | 523/160 |
| 2003/0082633 A1 * | 5/2003 | Martin et al. | ................. | 435/7.1 |

* cited by examiner

*Primary Examiner*—Manish S. Shah
*Assistant Examiner*—Laura E. Martin

(57) ABSTRACT

An inkjet ink capable of undergoing polymerization (curing) after exposure to microwave radiation, and method for printing and fixation the above ink on various substrates by ink jet printer and microwave source is disclosed.

Ink compositions suitable for microwave curing are provided. These inks overcome the problems associated with drying of solvent and water based inks, and curing of UV inks.

The present invention provides also a method for quick fixation of inks in which the ink vehicle is composed of molecules having appropriate dielectric properties.

8 Claims, No Drawings

MICROWAVE CURABLE INKS FOR INKJET PRINTING

RELATED U.S. APPLICATION DATA

This application is a continuation in part of U.S. application Ser. No. 10/694,876, filed Oct. 29, 2003, now abandoned which takes priority from U.S. Provisional Application No. 60/421,832, filed on Oct. 29, 2002, which is hereby incorporated by reference.

FIELD OF THE INVENTION

The invention relates to inkjet printing and in particular to printing with microwave radiation curable inks, and to a method of obtaining quick and selective curing of an image-bearing pattern by water based or solvent based inkjet inks.

BACKGROUND OF THE INVENTION

Industrial ink jet printing is a fast growing market. Particularly fast growing is on-demand printing of large size images on rigid and flexible substrates and especially on glass and marble. These on-demand images are printed within a very short time and immediately with printing completion should be ready for use. It is clear that the inks used for such printing should be instantly dried or preferably dried concurrently with the printing process. Conventional ink jet inks are composed of a liquid vehicle, and a colorant. The liquid vehicle contains mainly solvents, in which resins and additives such as wetting agents, dispersants, defoamers and other ink components required for proper ink operation are dissolved or dispersed.

The solvents are either organic solvents ("solvent based inks"), or water ("water based inks") together with water-soluble organic solvents. Typically, inks contain colorant at low concentration; generally below 10% of weight. Therefore, obtaining the final, dry print, should involve processes in which the liquid vehicle (solvents or water) is completely removed. Typically heat evaporates the solvent or water. Obviously, such processes require a significant amount of energy. Special drying ovens provide this energy. The ovens are large in size, consume significant amounts of energy, and complicate the printing equipment.

High-energy consumption is not the one and only problem associated with the inkjet inks drying process. If the drying process is applied to solvent-based inks the solvents removed to the atmosphere may cause health and environmental problems.

In order to dry fast the printed image the solvent removal rate should be fast. Increase in the solvent removal rate by increasing oven temperature is limited, due to the possible damage to the substrate onto which the ink is printed. Such heat sensitive substrate may be paper, polymeric substrate, foamed materials and other heat sensitive items.

Recently radiation curing ink methods, and in particular, UV curing methods have become popular. U.S. Pat. No. 6,114,406 to Caiger discloses a new class of ink jet inks, in which the vehicle is composed of monomers and oligomers capable of undergoing curing reactions or polymerization under the influence of for example UV light.

"Curing" in the context of the present disclosure means a process of converting a liquid and in particular ink into a solid, by exposure to electromagnetic radiation, which may be UV radiation. Use of the curing process is rapidly becoming an alternative to the established conventional heat drying process. Curing requires inks of different than drying ink compositions.

The ink composition worked out under this approach is often termed "100% solids ink". It overcomes several problems associated with regular solvent or water based inks that need to be dried: there is no need to remove solvents or water, the fixation of ink droplets is very fast, and the damage to the substrate is reduced. However, there are still severe drawbacks related to the use of UV curable ink jet inks.

The printing machine and especially the printheads and ink conducting tubing should be protected from stray light. Stray light may initiate uncontrolled and undesired ink curing within the machine even before printing takes place.

UV curable inks contain photo initiators at relatively high concentrations. These photo initiators are usually very expensive compared to the price of the rest of the components of the ink. UV curable inks cost typically two to three times more than regular solvent based inks.

The ink curing process requires radiation such as UV light. UV light is generated by expensive lamps, which consume large amount of energy a large part of which is typically converted into heat and heats the substrate. The lamps deteriorate with the time, and therefore should be replaced often.

Reflective surfaces reflect UV radiation. This complicates printing on reflecting surfaces such as glass, marbles and some plastic substrates where the reflected portion of the UV radiation causes undesired ink on the print head nozzle plate curing. This causes frequent print head changes and increases maintenance costs.

In order to obtain good curing of the ink by UV radiation, a sufficient UV radiation dose should be applied. Otherwise, uneven ink curing takes place, for example if the radiation will not penetrate through the whole ink layer, (especially in thick ink layers), the bottom layer of the ink will not be cured, leaving reactive monomers in the printed area, and interfering with the adhesion of the ink to the substrate. The final optical density of the ink is somehow limited, since too high colorant concentration would absorb a large fraction of the UV light. Absorption of UV light by the colorant competes with the absorption by the photo initiators, and may result in poor curing. Further to this the exposure to UV light may cause fading of the colorant, especially for organic dyes and some types of pigments.

Therefore there is a need in the industry for curable inkjet ink that is free of the above-mentioned drawback. Ink that uses lower cost ingredients and can be cured by easy producible curing radiation sources. Inks curing of which does not affect the substrate. SUMMARY OF THE INVENTION It is an object of the present invention to provide inkjet ink capable of undergoing rapid polymerization (curing) after exposure to curing radiation. Such radiation may be for example microwave radiation.

It is another object of the present invention to provide a method of ink-jet printing with the above ink on various substrates and especially heat sensitive substrates and quick subsequent curing and fixation of the ink on substrate by microwave radiation without affecting the heat sensitive substrate.

It is an additional object of the present invention to provide a method of ink-jet printing with the above ink on various substrates and especially on substrates reflecting optical curing radiation such as UV or IR radiation.

It is a further object of the present invention to provide a method for quick curing of inks in which the ink vehicle is composed of molecules having appropriate dielectric properties, and more specifically, to water based inkjet inks.

These and other objectives of the present invention may be achieved by providing a microwave radiation curable ink composition for piezo-electric drop-on-demand inkjet printing, comprising molecules of material capable of undergoing a polymerization reaction under the influence of the microwave radiation generated heat, microwave radiation absorber, thermal initiator, colorant and different additives.

A microwave radiation curable ink for piezo electric drop-on-demand ink-jet printing that contains molecules of material capable of undergoing a polymerization reaction under the influence of the microwave radiation generated heat are any one or a combination of acrylic monomers and oligomers containing acrylate groups.

The microwave radiation absorber is enhancing absorption of microwave radiation and conversion of microwave radiation energy into heat. The microwave radiation absorber for piezo electric drop-on-demand inkjet printing is at least one of carbon black, minerals, polar molecules such as alcohols, amines, ammonium salts, conductive polymers etc.

Microwave radiation curable ink for piezo electric drop-on-demand ink-jet printing where the heat generated by microwave radiation activates the thermal initiator. The thermal initiator is at least one of lauroyl peroxide, cumenn peroxide dicumyl peroxide, tert-amyl peroxy-benzoate, dentanedione-peroxide, 1,1'-azobis-cyclohexane carbonitryle.

Colorant provides the color properties of the ink and different additives affect such ink properties as wetting, foaming, adhesion and other as may be required by a particular application.

Microwave radiation curable ink for piezo electric drop-on-demand ink-jet printing where said additives are any one or a combination of wetting agents, dispersants, rheology modifiers, solvents, and defoamers.

The present invention provides also a method for recording and microwave curing of images printed by the ink of the present invention by a piezo drop-on-demand inkjet printer. The method comprising steps of providing ink having a microwave absorber and a thermal initiator. The absorber contained in the ink enhances absorption of microwave radiation. Printing with the ink having a microwave absorber and a thermal initiator an image bearing pattern on a substrate and irradiating by microwave curing radiation the printed image-bearing pattern. Microwave curing radiation cures the image-bearing pattern by heat. The heat is generated by conversion of microwave curing radiation energy into heat within the ink layer only and does not affect the substrate.

The method also enables printing on UV and IR radiation reflecting surfaces such as glass, marble and some plastic substrates. There is no reflected microwave radiation that can cause undesired ink on the print head nozzle plate curing. Print head maintenance costs are reduced.

According to one exemplary embodiment the curing can be performed immediately after the droplets are placed onto the substrate, yielding fast and reliable ink curing and image fixation.

According to another exemplary embodiment the curing can be performed after the image bearing ink pattern was deposited on the substrate. Curing after the image bearing ink pattern was deposited on the substrate also yields fast and reliable ink curing and image on substrate fixation.

The invention has particular importance in industrial printers, in which large substrates are printed within a short time interval. The ink composition is beneficial as compared with solvent and water based inks. The benefits of the ink disclosed by the particular invention are:

The microwave radiation is very simple to generate. The cost of a microwave curing radiation source is substantially lower than the cost of a similar UV curing system.

Microwave radiation penetrates into the whole ink layer, and polymerization occurs rapidly and has an even pattern at the interface between the ink and the substrate, ensuring good adhesion. Layers of ink substantially thicker than layers cured by the UV lamp may be cured by microwave radiation.

The radiation absorption is not limited by the colorant concentration or colorant-absorbing wavelength. In contrary, some colorants such as carbon black and inorganic pigments even contribute to the radiation absorbance.

The thermal initiators used in some of the ink compositions are much cheaper then the photoinitiators used for sensitization of the UV curable inks. This allows production of inks less expensive than UV curable inks.

The environmental and especially storage conditions for microwave curable ink are substantially more forging that the storage conditions for the UV curable ink.

Not like thermal or UV radiation the microwave radiation can be instantaneously turned ON and OFF, thus simplifying the operation of the printing machine and further reducing its cost and reliability since no complicate mechanical shutters arrangements, cutting-off the UV radiation at the stand-by and idle times are required.

The microwave radiation does not affect the substrate, and therefore it is suitable for ink curing on a wide range of heat sensitive substrates.

The absorption of radiation is localized only to the ink located in the image bearing areas, hence the efficiency of the microwave radiation curing process is higher than the UV curing process.

The microwave radiation sources are more efficient then conventional IR and UV radiation sources, thus minimizing the required energy for the process.

BRIEF DESCRIPTION OF THE INVENTION

The present invention is of a method of curing inkjet printed image-bearing ink patterns by applying microwave radiation to the printed ink only will be explained by a way of non-limiting examples only with reference to an exemplary ink composition.

Microwave radiation affects the substance or body to which it is applied by localized energy absorption, caused by the differences in the dielectric properties and polarity in a given body. (Dielectric properties refer to the intrinsic electrical properties that affect how materials interact with electromagnetic fields, such as microwaves). The use of microwave heating for example for food preparation or heating is well known in the art. Food, which contains a large proportion of water, responds to the electric portion of the microwave field by two major interaction mechanisms that cause heating.

The first mechanism is the dipolar rotation, and it depends on the influence of the microwave field upon dipoles. The high frequency microwave field, oscillating at 2450 MHz in microwave ovens, influences the vibrational energy in the water molecule and other dipoles and causes frictional heating. While materials other than water may be dipolar or may behave as dipoles due to the stress of the electric field, water usually dominates, probably because it is pervasive and at high concentrations in most foods.

The other heating mechanism is ionic conduction, which is a type of resistance heating depending on the acceleration of ions through solutions and the resulting multiple billiardball-like collisions. In foods or similar substances, the ions of salt-sodium and chlorine have a major effect upon the penetration depth explained below.

It should be emphasized that the application of microwave in the heating of food is performed for items having a large volume, while the present invention is related to curing of very thin films of ink, in the order of 3 to 80 micrometers, and preferably in the order of 6 to 30 micrometers. For example, water can be heated in a plastic vial or on a substrate, by applying microwave radiation to the vial and the water. After a given period of time, which depends on the radiation intensity, the water inside the vial is hot or on the substrate, while the vial or substrate are still cold.

The inventors of the present invention have found that it is possible to prepare liquids, which may be used as ink vehicle, and when irradiated by microwave radiation are capable of localized heating. Composition of such liquids requires use of components having appropriate dielectric properties responsive to microwave radiation.

Use of microwave radiation allows achieving within the ink layer temperatures higher then what conventional heat or IR drying ovens could achieve. The speed with which the ink heating process progresses is faster than the speed of the heat, produced by the elevated temperature of the ink, penetrates into the substrate. The mass of the ink is negligible as compared with the mass of the substrate. Non-conductive substrates are not heated by microwave radiation at all. Thus the heat does not adversely affect the substrate. This feature of the localized ink layer heating by microwave radiation is of great importance for plastic or foam made substrates, which may swell or warp under the heat and their dimensions are irreparably distorted if they are heated above their glass transition temperature Tg. Paper can even catch fire.

More specifically, it was found that it is possible to enhance and better utilize this phenomenon, to induce local heat generation, which is limited only to ink-coated areas of the substrate and more specifically to the ink layer only. Furthermore, enhancing the localized absorption of microwave radiation by addition of microwave radiation absorbing materials is utilized for local ink layer heating. The heat, generated by enhanced absorption of microwave radiation, initiates and accelerates polymerization of the ink, which is formulated to undergo polymerization by the microwave radiation. Thus, one may print by means of inkjet printer an image bearing ink pattern on a substrate, while the printed pattern is concurrently with printing exposed to the microwave radiation.

The concurrent with printing curing may be achieved by providing a source of microwave radiation coupled to each inkjet print head in way that it follows the path of the print head. As a result, each droplet of ink deposited on the substrate, is immediately polymerized, leading to ink with superior fixation. The fixation obviously improves print quality, prevents ink bleeding, and overcomes the need for drying. Alternatively microwave radiation source may follow all four print heads (for four process color printing) and be operative on all four printed inks simultaneously. For cases where more than four colors are printed microwave radiation source may follow all five or six or more print heads.

The ink suitable for such microwave curing process should contain components, which may undergo polymerization reaction by absorbing microwave radiation. The ink may be solvent based, water based or 100% solid (polymeric) ink. In a particular example the microwave radiation was used for curing solvent-based inks (inks in which the primary solvent is not water, and solvent content is more then 60%). In these inks, which contain mostly reactive diluents (monomers and molecules that can undergo polymerization reaction), application of the microwave radiation may initiate polymerization (curing) reaction that results in a polymerized ink film. Ink polymerization takes place due to conversion of the monomers into a polymer. In such inks, the solvent properties such as dielectric constant should be selected properly to ensure curing of the monomers due to the microwave radiation.

Table 1 presents a typical formulation of ink ("100% solids"):

TABLE 1

Formulation A

| Ingredient | Percentage by Weight |
| --- | --- |
| Trimethylolpropane-triacrylate | 5% |
| Aminoacrylate (CN-383) | 4% |
| BYK-163 (surfactant and dispersant) | 0.5% |
| Pigment (Pigment may comprise the following pigments: Permajet Blue B2G, or Microlith Black CK, or Permajet Yellow, or Microlith Red 5C-K or mixture of several pigments | 3% |
| Hexanedioldiacrylate | 87.5% |

This particular ink formulation when subject to application of microwave energy causes polymerization of acrylate monomers. The acrylate monomers are polymerized through their double bond, but obviously, many other monomers and oligomers can be utilized, as long as the microwave irradiation and the generated heat would cause polymerization reaction.

The ink may contain other components, which would improve the polymerization reaction, and the absorption of microwave energy. Examples of components of the first group are thermally activated initiators, which are capable of initiating polymerization reaction after reaching a specific temperature range. Not limiting examples of such thermally activated initiators are lauroyl peroxide, cumenn peroxide dicumyl peroxide, tert-amyl peroxy-benzoate, dentanedione-peroxide, 1,1'-azobis-cyclohexane carbonitryle.

The thermally activated initiators may be selected according to the target temperature to be achieved in the wet ink film after absorption of a given dose of microwave radiation, and are not limited to the above examples. Examples of the second group, components capable of increasing the absorption of microwave radiation are: carbon black, minerals, polar molecules such as alcohols, amines, ammonium salts, conductive polymers etc.

Another exemplary ink formulation containing IR or heat activated initiators was created on the basis of Formulation A by adding to it the following heat activated initiators ("thermal initiator"):

TABLE 2

Formulation B:

| Ingredient | Percentage by Volume |
| --- | --- |
| Lauroyl peroxide | 0.1%-2% |
| Formulation A | 98%-99.9% |

The benefits obtained by application of this invention are summarized below:

i. The microwave radiation is very simple to achieve, at relatively low cost as compared to UV curing systems
ii. The radiation penetrates into the whole ink layer, even very thick ink layers, and polymerization occurs rapidly even at the interface between the ink and the substrate, ensuring good adhesion
iii. The radiation absorption is not limited by the colorant concentration. In contrary, some colorants such as carbon black and inorganic pigments improve the radiation absorbance
iv. The thermal initiators used in some of the ink compositions are much cheaper then the photoinitiators, thus much cheaper inks can be manufactured
v. There is no need for special storage conditions for the ink
vi. The microwave radiation can be instantaneously turned ON and OFF, thus simplifying the operation of the printing machine
vii. The microwave radiation does not affect the substrate, and therefore it is suitable for a wide range of heat sensitive substrates
viii. The curing can be obtained immediately after the droplets are placed onto the substrate, yielding fast fixation. The curing can be also achieved after the printing was performed
ix. The absorption of radiation is localized only in printed areas, and more particularly in the ink layer only, thus increasing the efficiency of the process.
x. The microwave radiation is more efficient then conventional IR and UV radiation sources, thus minimizing the required energy for the process.

Microwave radiation is not reflected from the glass surface or other light or optical radiation reflecting surfaces, such as different plastics and marbles. Ink is not cured on the nozzle plates of the print heads. Machine maintenance is reduces and accordingly the printing cost is reduced.

It was also found, that one may use a conventional UV curable ink jet ink, which contain suitable photoinitiators, for printing followed by microwave irradiation, and obtain good curing, without any UV radiation.

The above disclosure is intended as merely exemplary, and not to limit the scope of the invention, which is to be determined by reference to the appended claims.

What is claimed:

1. A microwave curable ink for piezo electric drop-on-demand inkjet printing, comprising:
   a. molecules of material in said ink capable of undergoing a polymerization reaction under the influence of microwave radiation;
   b. a microwave radiation absorber in said ink, said absorber enhances absorption of microwave radiation and conversion of said radiation into heat;
   c. a thermal initiator in said ink, said initiator being activated by heat generated by said microwave radiation; and
   d. a colorant in said ink.

2. The ink according to claim 1, wherein said molecules are acrylic monomers, acrylic oligomers or any combination thereof.

3. The ink according to claim 1, wherein said microwave radiation absorber is at least one of carbon black, minerals and polar molecules.

4. The ink according to claim 1, wherein said thermal initiator is at least one of lauroyl peroxide, cumenn peroxide dicumyl peroxide, tert-amyl peroxy-benzoate, dentanedione-peroxide, and 1,1'-azobis-cyclohexane carbonitryle.

5. The ink according to claim 1 further comprising one or more additives, said additives are wetting agents, dispersants, rheology modifiers, solvents, or defoamers.

6. The ink according to claim 1, where said molecules are monomers and oligomers containing acrylate groups.

7. The ink according to claim 3, wherein said microwave radiation absorber comprises said polar molecules, said polar molecules comprising alcohols, amines, ammonium salts or conductive polymers.

8. The ink according to claim 1, wherein the ink contains only polymerizable components, which are converted into polymeric coating only after printing and by exposure to microwave radiation.

* * * * *

UNITED STATES PATENT AND TRADEMARK OFFICE
CERTIFICATE OF CORRECTION

PATENT NO. : 7,296,884 B2
APPLICATION NO. : 10/811863
DATED : November 20, 2007
INVENTOR(S) : Eytan Cohen et al.

It is certified that error appears in the above-identified patent and that said Letters Patent is hereby corrected as shown below:

In column 2, lines 48-49, after "substrate." delete "SUMMARY OF THE INVENTION" and insert the same on line 49 as a heading.

Signed and Sealed this

Fifth Day of August, 2008

JON W. DUDAS
*Director of the United States Patent and Trademark Office*